Nov. 30, 1943.    F. M. WEIR    2,335,624
METHOD OF FORMING LAMINATED SHEET BODIES
Filed Jan. 30, 1941    2 Sheets-Sheet 1
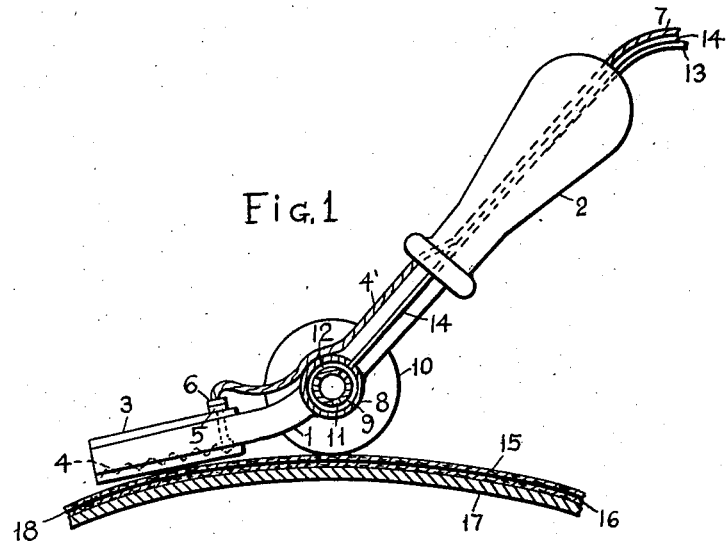
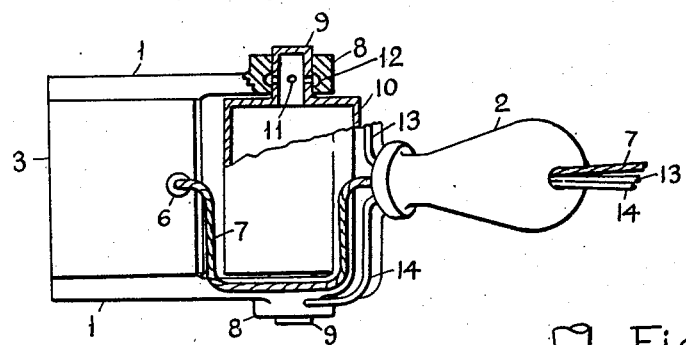
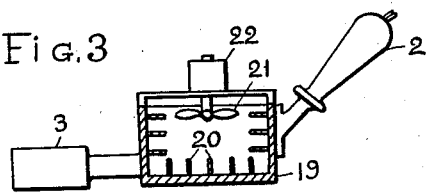   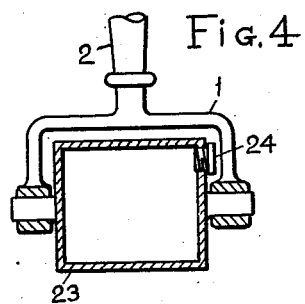
FRANCIS M. WEIR
INVENTOR.
BY John P. Nixonov
ATTORNEY Nov. 30, 1943.  F. M. WEIR  2,335,624
METHOD OF FORMING LAMINATED SHEET BODIES
Filed Jan. 30, 1941   2 Sheets-Sheet 2
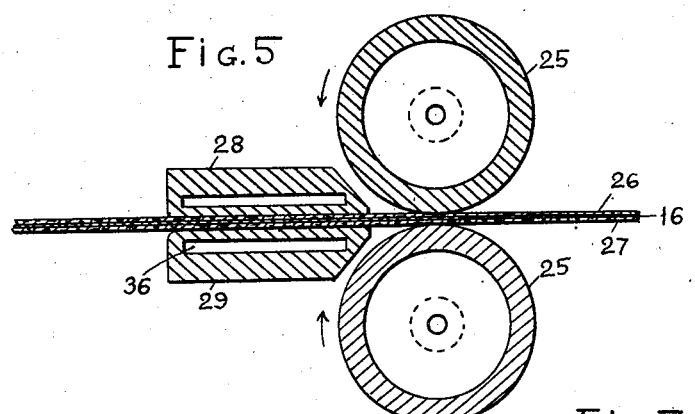
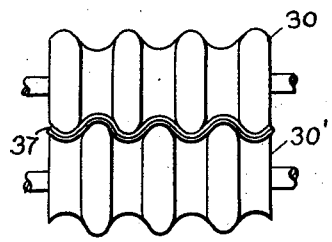
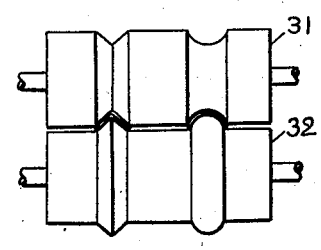
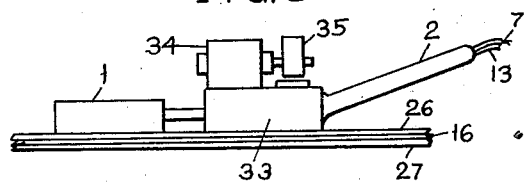
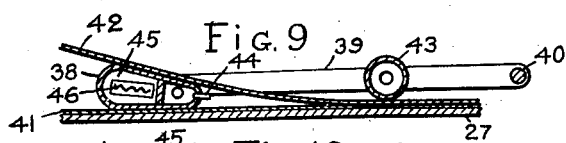
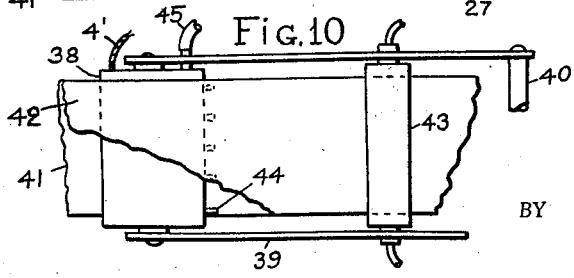
FRANCIS M. WEIR
INVENTOR.
BY John P. Wironow
ATTORNEY Patented Nov. 30, 1943

2,335,624

UNITED STATES PATENT OFFICE 2,335,624

METHOD OF FORMING LAMINATED SHEET BODIES

Francis M. Weir, Brooklyn, N. Y., assignor, by direct and mesne assignments, to Marine-Air Research Corporation, Annapolis, Md.

Application January 30, 1941, Serial No. 376,586

2 Claims. (Cl. 144—309)

My invention relates to methods and devices for forming laminated sheet bodies and has particular reference to the making of composite sheets and hollow objects by cementing together sheets of a fibrous material, such as wood veneer.

It has been found that veneer represents a very good material for forming hollow bodies, such as pontoons, boats, airplane fuselages, etc., by cementing together two or more layers of veneer. In forming curved bodies, especially having a double curvature, it was found necessary to apply heat and pressure to the veneer layers in special moulds by placing the moulds or dies with the veneer in autoclaves. This method is very expensive, however, and, besides, it has a disadvantage in that it is difficult to avoid overlapping of the veneer layers, the overlapped joints causing irregularities in the surface of the article and preventing proper adhesion at the sides of the overlapping joint.

I have found that better results can be obtained by using a special device for successively heating and cementing different portions of the product. Veneer sheets are placed for this purpose on a mould and temporarily held in place, with a layer or coating of a thermoplastic material between the layers. Heat is then applied locally to one portion of the veneer until the thermoplastic material is softened, the softened portion being then compressed or rolled, being at the same time cooled for hardening the cement.

My invention is more fully described in the accompanying specification and drawings, in which:

Fig. 1 is an elevational view of my device in operation;

Fig. 2 is a top plan view of the same;

Fig. 3 is a sectional elevational view of a modified device;

Fig. 4 is a sectional view of another modification;

Fig. 5 is a diagrammatic view of rolls for making continuous sheets;

Fig. 6 is a side view of the rolls for making corrugated sheets;

Fig. 7 is a side view of the rolls for making angles and similar shapes;

Fig. 8 is a modified device employing an electric vibrator;

Figs. 9 and 10 are views of a modified arrangement.

My device for forming laminated bodies consists of a frame 1 having a handle 2 for its manual operation. A heating pad 3 is supported at the end of the frame and consists of a hollow metal block having an electric heating element 4 inside. Leads from the heating element are connected to a receptacle 5 for a plug 6 with cords 7 extending to the outside through a central hole in the handle 2.

The middle portion of the frame 1 has bearings 8 at the ends for trunnions 9 of a hollow roll 10. The trunnions are also hollow and have openings 11 in communication with inner annular grooves 12 in the bearings 8. The grooves are connected with pipes 13 and 14 held in the bearings, the pipes extending to the outside through the central hole in the handle 2. The pipe 13 is used for delivering cooling liquid into the roll 10, the pipe 14 exhausting the liquid, so that the latter may be made to circulate continuously through the roll for its cooling.

My device is preferably used for building up hollow structures from a thin wood veneer. Layers or sheets 15 and 16 of such veneer are placed over a mould or frame 17, the contacting surfaces of the veneer sheets being coated as by spraying with a layer 18 of a thermoplastic cementitious material having preferably its softening point well above ordinary temperatures, as, for instance, 130° or 140° F. The veneer is placed on the mould and is temporarily held in place, as, for instance, by the operator's left hand. The device is then placed on the veneer with the heating pad over a starting point. The heat melts or softens the cementitious material 18, permitting the veneer to be cemented together by the application of pressure. This is accomplished by passing the roll 10 over the heated spot with the application of a suitable pressure until the veneer sheets are glued together, the cold roll 10 hardening the material 18.

The roll 10 may be replaced with a cooling box 19, Fig. 3, the box being hollow and provided with cooling fins 20. The latter may be further cooled by the draft from a fan 21 operated by a small electric motor 22.

In another modification shown in Fig. 4, the hollow roll 23 is entirely enclosed and provided with a hole at the end closed with a screw plug 24. The roll can be filled with a cooling liquid such as brine, with ice or with frozen carbon dioxide ("dry ice").

The heating pad may be heated in any suitable manner and may be provided, for instance, with a gas or kerosene burner.

My method can be also used for joining wood or other fibrous material with metal sheets or sheets made of a synthetic plastic material. Fig.

5 shows an application of my method to the manufacturing of continuous sheets. Rolls 25 are used for this purpose operated by a suitable source of power (not shown) for rolling veneer sheets 26 and 27. The sheets are heated before rolling between stationary heating blocks 28 and 29.

Corrugated rolls 30, Fig. 6, may be employed for making corrugated veneer or other laminated sheets.

Built-up veneer angles and similar shapes can be manufactured by rolling thin strips between specially shaped rolls 31 and 32, Fig. 7.

A modified device is shown in Fig. 8, having a cold pressure block 33 with an electric motor 34 operating a vibrator 35. In this device the veneer sheets are joined together by the hammering effect produced by the vibrator.

Another modification is shown in Figs. 9 and 10, in which a block 38 is employed in the form of a wedge supported at the ends in a frame 39 with a handle 40, if it is intended for manual operation.

The wedge 38 is placed between two sheets 41 and 42, a cooled roller 43 being provided for pressing the sheets together. The sheets in this case are not coated with a binder, the latter being sprayed by nozzles 44 from a hollow compartment 45' in the block 38, pressure being applied through a hose 45. The plastic composition is maintained in a melted condition by the heating element 46 in the block 38. The sides of the block, being in contact with the sheets 41 and 42, preheat them for the plastic composition. Suitable controlling devices may be, of course, provided for maintaining desired temperature of the plastic composition; also for applying desired pressure to the roller.

It should be understood that the term "thermoplastic" used herein includes all such plastic compositions which require heat for their moulding, regardless of whether they retain their property to be softened by the subsequent application of heat, or become permanently solidified upon cooling.

It is understood that my device for forming laminated sheet bodies may be further modified without departing from the spirit of the invention, as set forth in the appended claims.

I claim as my invention:

1. A method of forming a composite laminated sheet, consisting in joining together at least two strips of sheet material with a layer of a substance therebetween having thermoplastic properties, imparting to the sheet the desired curvature, applying heat without pressure to successive points of the sheet in a continuous movement, and applying pressure with heat extraction to the points behind the points of application of heat.

2. A method of forming a composite laminated sheet, consisting in joining together at least two strips of sheet material with a layer of a substance therebetween having thermoplastic properties, imparting to the sheet the desired curvature, applying radiant heat without pressure to successive points of the sheet in a continuous movement, and applying pressure with heat extraction to the points behind the points of application of heat.

FRANCIS M. WEIR.